US005523816A

United States Patent [19]

Sherman, Jr. et al.

[11] Patent Number: 5,523,816

[45] Date of Patent: Jun. 4, 1996

[54] FILM CARTRIDGE MAGAZINE

[75] Inventors: Gerald F. Sherman, Jr., LeRoy; Dale W. Ryan, Rochester, both of N.Y.

[73] Assignee: Eastman Kodak Company, Rochester, N.J.

[21] Appl. No.: 336,455

[22] Filed: Nov. 9, 1994

[51] Int. Cl.$^6$ .......... G03B 17/26

[52] U.S. Cl. .......... 354/275; 354/340; 221/87; 221/131

[58] Field of Search .......... 354/275, 354, 354/340; 221/69, 70, 75, 76, 88, 90, 89, 91, 119, 82, 131, 197

[56] References Cited

U.S. PATENT DOCUMENTS

| | | | |
|---|---|---|---|
| 1,753,248 | 4/1930 | Nutt | 221/90 |
| 2,275,985 | 3/1942 | Prins | 194/63 |
| 2,371,316 | 3/1945 | Rice et al. | 312/97.1 |
| 3,242,931 | 3/1966 | Wandrey | 133/6 |
| 4,164,301 | 8/1979 | Thayer | 220/253 |
| 4,809,877 | 3/1989 | Albright | 221/75 |
| 4,838,453 | 6/1989 | Luckstead | 221/2 |
| 5,004,966 | 4/1991 | Eakin | 318/446 |
| 5,034,836 | 7/1991 | DeMarti, Jr. et al. | 360/104 |
| 5,191,997 | 3/1993 | Squitieri | 221/119 |
| 5,242,080 | 9/1993 | Kroon et al. | 221/113 |
| 5,450,160 | 9/1995 | Tianello et al. | 354/354 |

OTHER PUBLICATIONS

Research Disclosure, Nov. 1982 pp. 366, 367, "Rapid Random Access Retrieval Apparatus" by R. J. Roman.

*Primary Examiner*—D. Rutledge
*Attorney, Agent, or Firm*—Frank Pincelli

[57] ABSTRACT

A magazine for containing a plurality of film cartridges and a method of using same. The magazine comprising at least one storage disk having a plurality of sleeves defining passages at both ends for retaining at least one of the film cartridges between the open ends. The magazine having a shutter mechanism disposed adjacent to at least one end of the at least one storage disk. The shutter mechanism comprising a first dispensing disk having a first access opening and a first central axis of rotation, and a second dispensing disk associated with and adjacent to the first dispensing disk. The second dispensing disk having a central axis of rotation in co-alignment with the first central axis and a second access opening. The second access opening being positioned on the second dispensing disk such that when the first and/or second dispensing disk is rotated about the central axis of rotation, the second access opening of the second dispensing disk is capable of aligning up with the first access opening of the first dispensing disk. A spring is provided for biasing the first and second dispensing disks about the first and second central axis of rotation such that the access openings of the first and second dispensing disks can be moved between an aligned position and non-aligned position.

12 Claims, 6 Drawing Sheets

FILM CARTRIDGE MAGAZINE

CROSS REFERENCE TO RELATED APPLICATION

Reference is made to commonly assigned patent application U.S. Ser. No. 08/336,559, filed Nov. 9, 1994 herewith in the names of Thomas C. Merle, Dale W. Ryan, Walter C. Slater, David L. Rowden, Gerald F. Sherman, and Alfonso Ianni, entitled FILM CARTRIDGE RECOVERY TOOL, and copending patent application U.S. Ser. No. 08/172,013, filed Dec. 22, 1993, entitled FILM CARTRIDGE MAGAZINE, in the names of Dennis F. Tianello, Alfonso Ianni, John A. Romansky, Gerald F. Sherman, Jr., William T. Matthias and Ralph E. Williams, the disclosures of which are hereby incorporated by reference into the present application.

1. Field of the Invention

The present invention relates to magazines for use in photography which facilitates the handling of a plurality of film cartridges in the photofinishing process.

2. Description of Prior Art

In U.S. Ser. No. 08/172,013, filed Dec. 22, 1993, entitled FILM CARTRIDGE MAGAZINE, in the names of Dennis F. Tianello, Alfonso Ianni, John A. Romansky, Gerald F. Sherman, Jr., William T. Matthias and Ralph E. Williams, there is disclosed a cartridge magazine suitable for use in many different applications. The magazine includes at least one disk-shaped core member having a plurality of sleeves disposed about its periphery which align with the sleeves in adjacent cores. Each sleeve is designed to retain a film cartridge. The magazine includes a shutter mechanism adjacent the upper and lower cores for controlling insertion and removal of cartridges into and out of the magazine. The sleeves are designed to allow the film cartridges to easily pass through the magazine. It is important in such magazines that it be reliable and easy to use, either manually or automatically by machine. It is also important that cartridges do not accidentally leave the magazine. An additional operational criteria is that the cartridges be allowed to easily pass through the sleeves and that the chance of jamming of the cartridges within the magazine be minimized.

The present invention provides a magazine which includes a shutter mechanism which can be operated manually or automatically by machine, which is simple in construction and easy to use. The magazine is also designed to minimize the possibility of cartridges from accidentally coming out of the magazine, and jamming occurring between the film cartridge and shutter mechanism. Positive stop features are also provided for defining the open and closed positions of the shutter mechanism.

SUMMARY OF THE INVENTION

A magazine for containing a plurality of film cartridges and a method of using same. The magazine comprising at least one storage disk having a plurality of sleeves defining passages at both ends for retaining at least one of the film cartridges between the open ends. The magazine having a shutter mechanism disposed adjacent to at least one end of the at least one storage disk. The shutter mechanism comprising a first dispensing disk having a first access opening and a first central axis of rotation, and a second dispensing disk associated with and adjacent to the first dispensing disk. The second dispensing disk having a central axis of rotation in co-alignment with the first central axis and a second access opening. The second access opening being positioned on the second dispensing disk such that when the first and/or second dispensing disk is rotated about the central axis of rotation, the second access opening of the second dispensing disk is capable of aligning up with the first access opening of the first dispensing disk. A spring is provided for biasing the first and second dispensing disks about the first and second central axis of rotation such that the access openings of the first and second dispensing disks can be moved between an aligned position and nonaligned position.

BRIEF DESCRIPTION

These and other features and advantages of the invention will become more clearly understood and appreciated from a review of the following detailed description of the preferred embodiments and the appended claims.

DETAILED DESCRIPTION OF THE INVENTION

Figure 5:
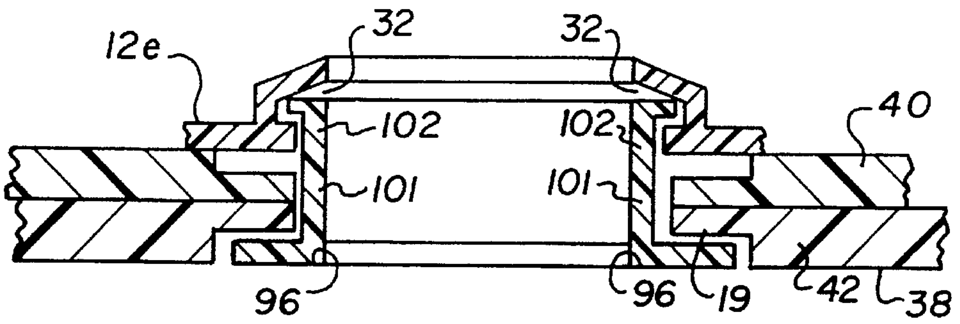
FIG. 5 is an enlarged partial cross-sectional view illustrating how the lower cap member secures the lower shutter assembly to the lower most core section as taken along line 5—5 of FIG. 1A.
Figure 6:
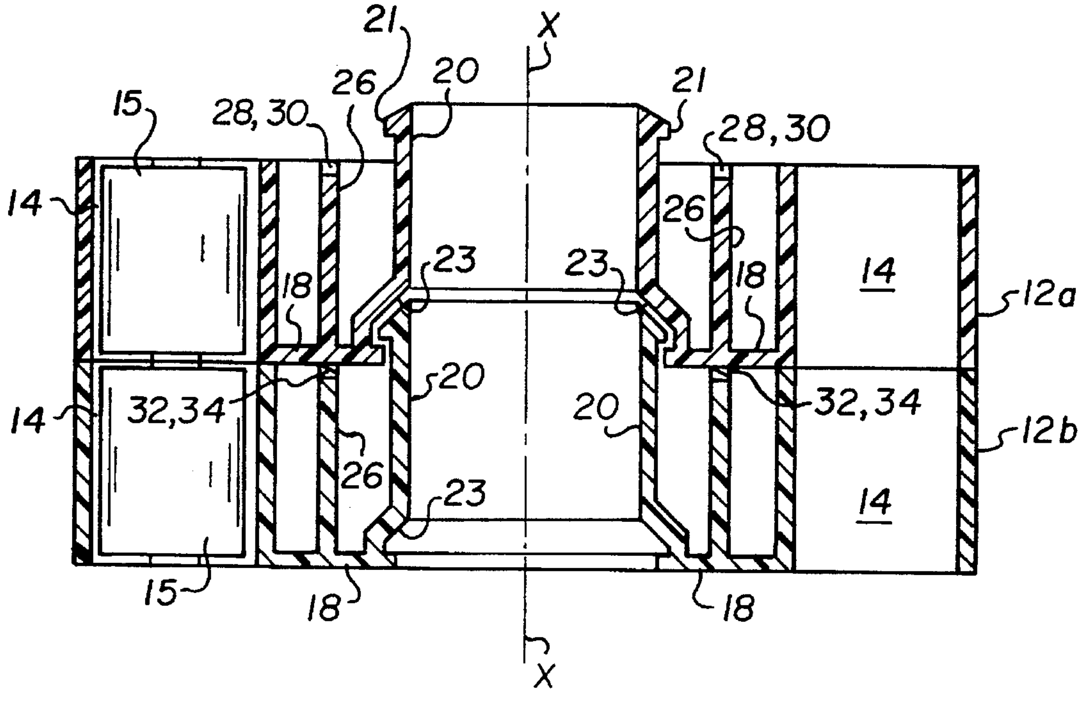
FIG. 6 is a cross-sectional view of a pair of adjacent core members illustrating how the core members are secured together as taken along line 5—5 of FIG. 3.

Referring to FIGS. 1–8, there is illustrated a magazine 10 made in accordance with the present invention. The magazine 10 includes a plurality of core members 12, which in the embodiment illustrated are separately identified as **12*a*,12*b*, 12*c*,12*d*,12*e*,12*f*. Each core member 12 has a generally disk-shaped configuration and has a plurality of sleeves 14 disposed in a predetermined pattern about its periphery. The sleeves 14 of each adjacent core member 12 is designed to be in co-alignment with the sleeves 14 of the adjacent core members 12. The sleeves 14 of each core member 12 are designed to allow a film cartridge 15 (as shown in FIG. 6) to be retained therein. Preferably, the sleeves are sized so that films cartridges may slide freely through the sleeves 14 without restriction. Each core member 12 includes a hub 18 having a plurality of upper projecting members 20. The upper projecting members 20 have a locking member 21 designed to engage an annular recess 23 provided on the bottom surface of hub 18 of the adjacent core member 12 so that they can be easily locked together as a unit. The upper annular projecting members 20 are sufficiently flexible so as to provide a radially extending force to hold core members 12 together such that a substantially continuous passage is formed between adjacent sleeves 14. The flexibility of projecting member 20 is such that adjacent core members can be disassembled by providing a sufficient amount of force in the axial direction x—x to allow projecting member 20 to disengage recess 23. It is, of course, understood that any other desired means may be provided for detachably securing adjacent core members 12 together. As is quite evident, any desired number of core members 12 may be placed together. In the particular embodiment illustrated, six core members 12 are provided, each having twenty sleeves 14. Thus, in the embodiment illustrated, the magazine 10 may hold 120 film cartridges. In order to properly assure that the sleeves 14 between adjacent core members 12 are co-axially aligned, means are provided so that the adjacent core members 12 can be quickly aligned. In the particular embodiment illustrated, the hub 18 is provided with an annular projecting member 26 which is disposed radially outward of the projecting members 20 and radially inward of the sleeves 14. The annular member 26 is provided with a plurality of alternating step ridges 28 and step recesses 30 (see FIG. 3), which are designed to mate with corresponding step recesses 32 and step projections 34 on the adjacent hub 18. The ridges 28, recesses 30,32, and projections 34 are sized and shaped so that when they are properly mated together, sleeves 14 of adjacent core members 12 will be in axial alignment. Thus, the adjacent core members 12 can be quickly aligned by biasing the core members together and rotating the adjacent core members 12 until the step ridges 28 and recesses 30 engage. In the embodiment illustrated, a handle 31 is provided atop projecting member 20. As can be seen, handle 31 extends about the small portion of the circumference. Handle 31 is provided with cut-outs 33 so that projecting members 20 can flex appropriately. Preferably, handle 31 is integrally formed as a part of projecting members 20**.

Figure 2:
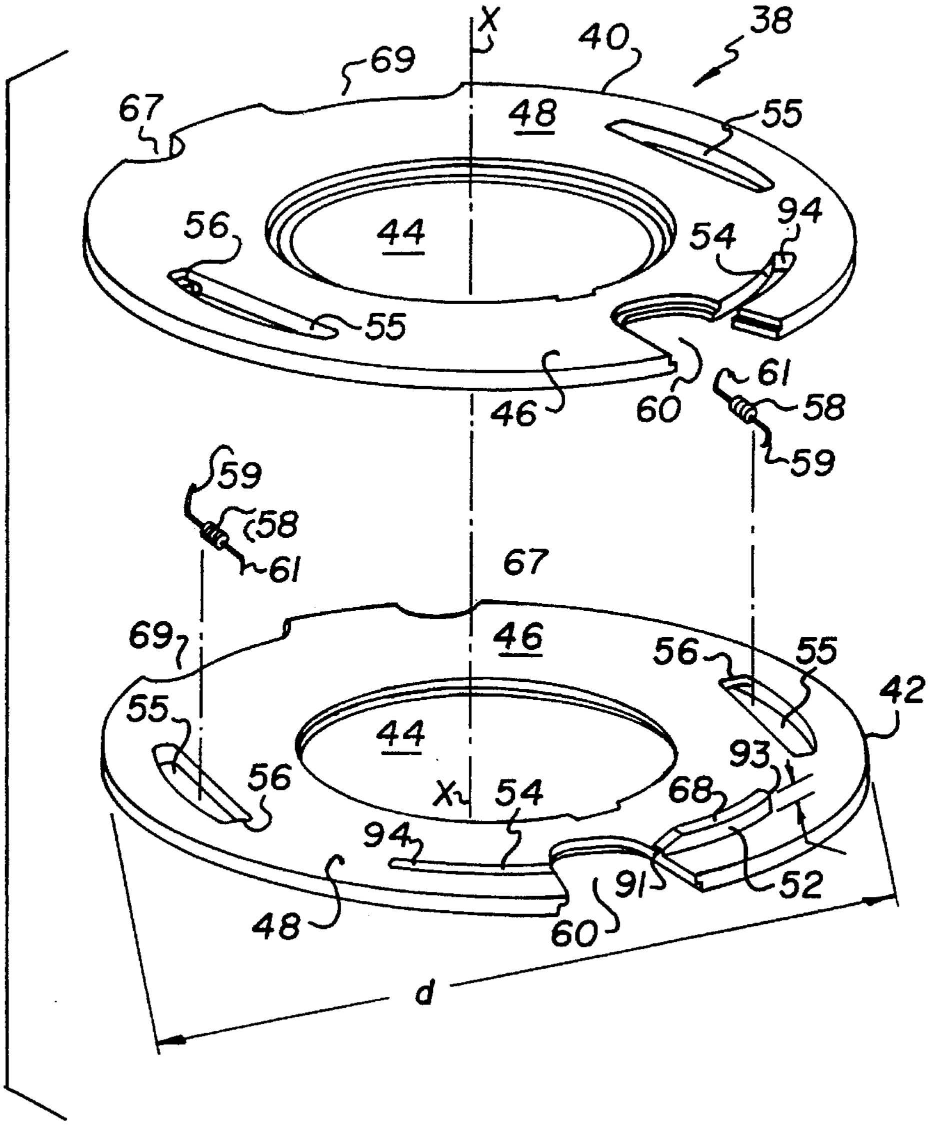
FIG. 2 is an enlarged view of one of the shutter assemblies of FIG. 1A.
Figure 4:
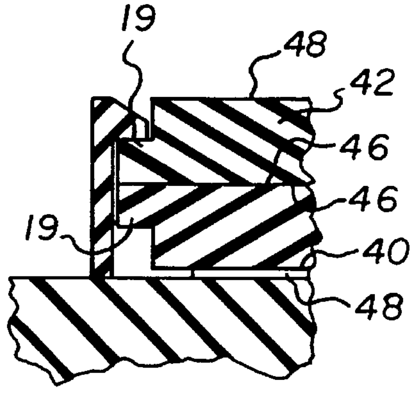
FIG. 4 is a partial enlarged cross-sectional view of the magazine of FIG. 3 as taken along line 4—4 illustrating how the top core member of the magazine is secured to the upper shutter assembly.
Figure 3:
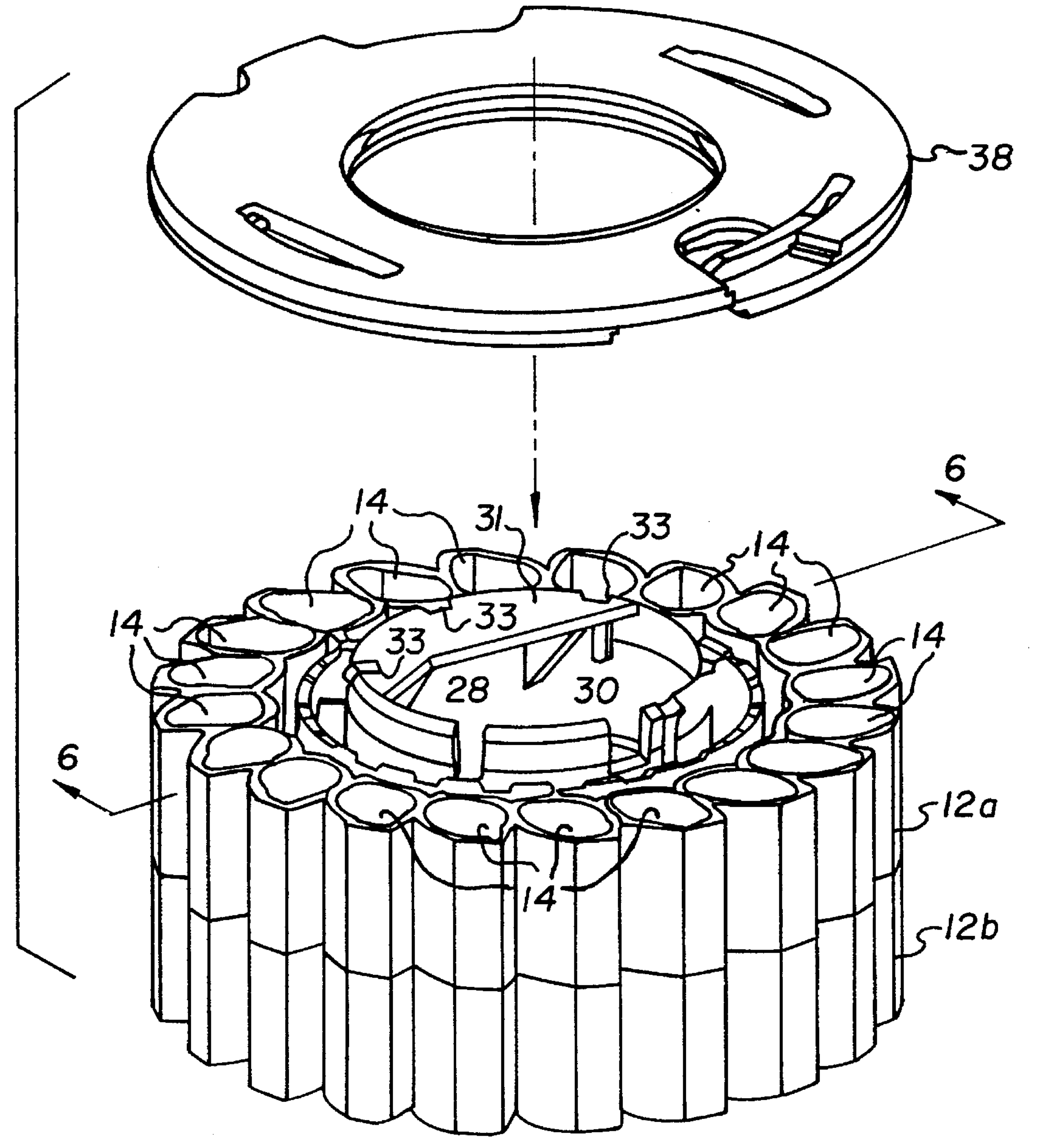
FIG. 3 is a partial exploded view of the upper portion of the magazine of FIG. 1B.
Figure 7:
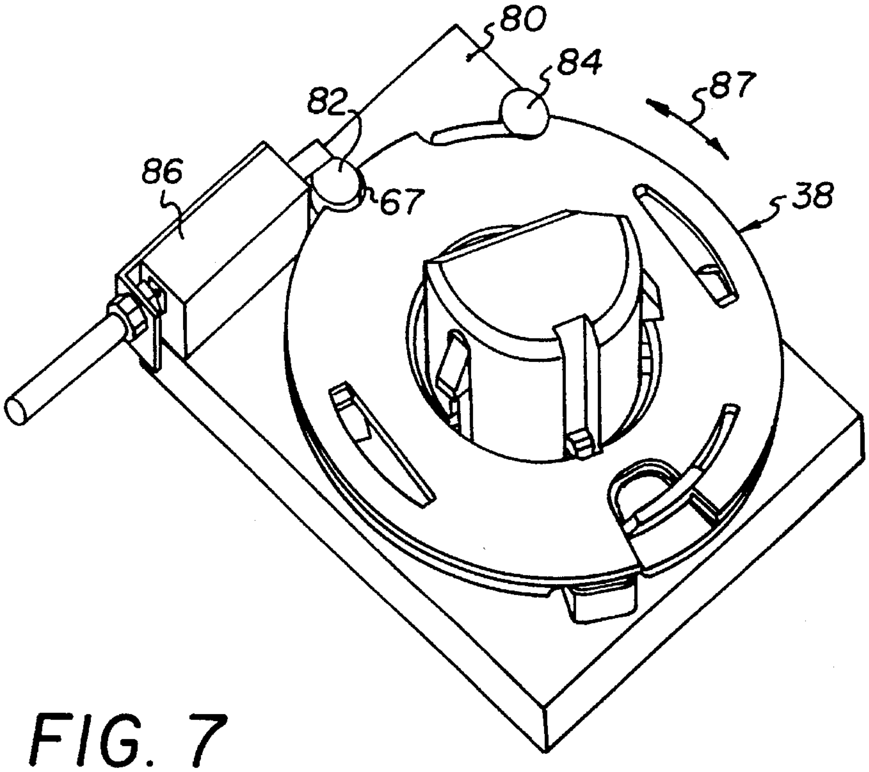
FIG. 7 is an illustration of how the lower shutter assembly mechanism engages a photofinishing apparatus designed to receive the magazine of FIG. 1A with the shutter assembly in the closed position.

The magazine 10 further includes an upper shutter assembly 36 disposed atop the upper core member 12*a* and a lower shutter assembly 38 disposed adjacent the lower core member 12*f*. Each of the upper and lower shutter assemblies 36,38 are substantially identical in construction and operation, therefore, only one shutter assembly will be described in detail, it being understood that the other shutter assembly is identical in configuration and function. Referring to FIG. 2, there is illustrated an exploded view of the lower shutter assembly 38, which comprises an inner disk member 40 (which is disposed adjacent core member 12) and an outer disk member 42. In the preferred embodiment illustrated, the disk members 40,42 are identical in configuration so as to reduce manufacturing costs and the number of parts necessary to stock. Each of the disk members 40,42 has a substantially circular outer configuration having a diameter d and having an inner circular opening 44, which is concentric about the rotational axis x—x of the members 40,42. The disk members 40,42 each have an inner surface 46 and an outer surface 48. The inner surfaces 46 are configured so that they can be placed adjacent one another and are able to rotate about the central axis x—x as discussed later herein. Each of the disk members 40,42 are designed such that they will be adjacent the sleeves 14 of the core members such that film cartridges can not be placed into or removed from the magazine unless the disk members are rotated to the open position as discussed later herein. The disk members 40,42 are each provided with a arcuate extending projecting member 52 which is designed to mate in a corresponding circumferential extending groove 54. An access opening 60 is provided in each member 40,42, which when in co-alignment allow the insertion or removal of film cartridges from the sleeves 14. The disk members are also each provided with a pair of openings 55, which are preferably disposed 180° apart. Adjacent one end of each of the openings 55, there is provided a hole 56 for receiving one end of a spring 58, the other end of the spring being secured to the hole 56 in the adjacent disk member. Thus, one end 59 of spring 58 will fit into the hole 56 on disk member 42 and the other end 61 of the spring member 52 will fit into the hole 56 of the inner disk member 40. The openings 55 are sized to receive the spring 58 such that the spring 58 does not interfere with rotation of the members 40,42. When the two springs 58 are properly hooked to each of the adjacent disk members 40,42, a circumferential biasing force will be provided for biasing the disk members in a first position as shown in FIGS. 3 and 7. The annular projections 52 and annular grooves 54 are designed to have a circumferential length which limits the amount of movement the adjacent disk members 40,42 may rotate. The springs 58 are designed such that the disk members 40,42 will be biased in a normally closed position, thereby keeping the access opening 60 of one disk at a location different from the access opening 60 of the adjacent disk as illustrated in FIG. 3. In this condition, the disk members 40,42 cover sleeves 14, thus preventing film cartridges from being placed into or dispensed from the magazine 10. The projections 52 each have a height h such that the top 68 of projection 52 is substantially flush with the outer surface 48 of the adjacent disk member such that if there is a cartridge present in the sleeve 14 adjacent opening 60, the cartridge will not fall into the dispensing opening 60 of the inner disk member 40. The disk members 40,42 are also provided with side cut-out sections 67,69, which may be used for rotating of the disk members 40,42 relative to each other. When the cut-out 60 of each of the disk members 40,42 are in circumferential alignment as shown in FIG. 8, there is provided a dispensing opening 70 whereby film cartridges may be placed into or removed from the sleeve adjacent the dispensing opening 70 formed by the shutter assembly.

Figure 8:
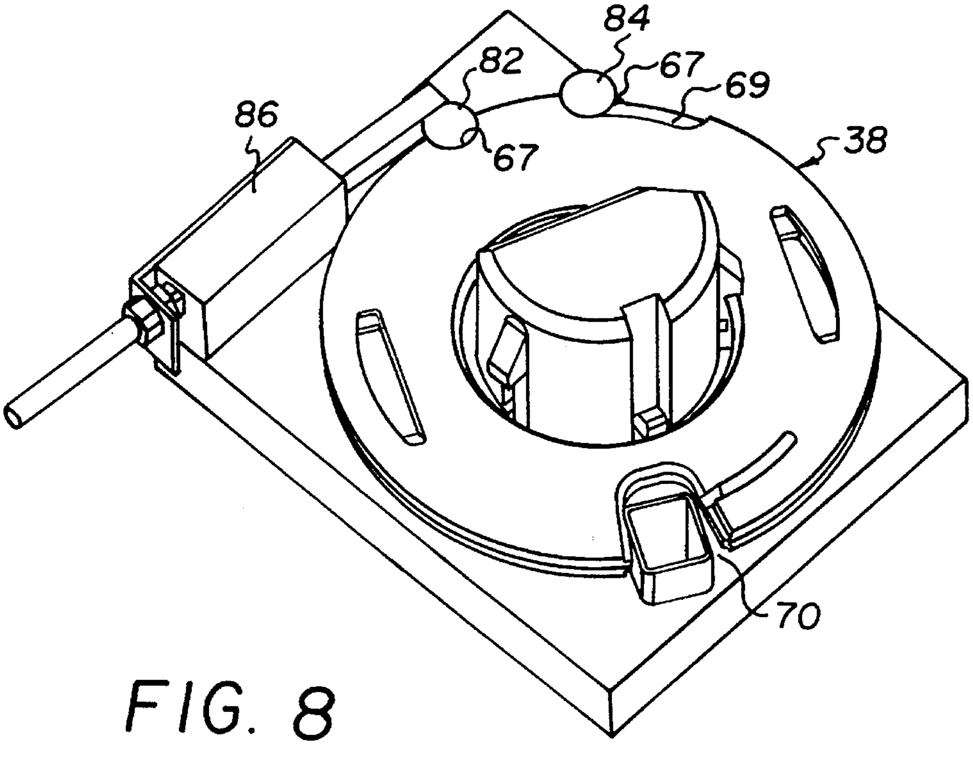
FIG. 8 is a view similar to FIG. 7 illustrating the lower shutter assembly in the open position whereby a film cartridge in the adjacent sleeve in the lower most core member would be released to the adjacent photofinishing device.

Referring to FIGS. 7 and 8, there is illustrated the shutter assembly as it engages the interface of a photofinishing apparatus into which film cartridges may be dispensed. For the purpose of clarity, the core members are not shown so as to illustrate the operation of the shutter assembly. FIG. 7 illustrates the shutter assembly in the normally closed position, and FIG. 8 illustrates the shutter assembly in the open position. As can be seen, there is provided a mechanism for receiving magazine 10. In particular, there is provided a mounting plate 80, on a typical photofinishing apparatus, for receiving of the lower shutter assembly 38. The receiving plate 80 includes a first projection 82 designed to mate with the cut-out section 67 formed on the inner disk member 40 and a second projection 84 designed to mate with the cut-out section 67 on the outer disk member 42. The upper projection 82 is capable of being moved between a first position as illustrated in FIG. 7 to a second position as illustrated in FIG. 8. In the particular embodiment illustrated, a solenoid 86 is used for this purpose. However, it is to be understood that the projection 82 can be moved by any desired mechanism. The projection 84 restrains the outer disk member and prevents it from being rotated in the direction indicated by arrow 87. The projection 82, which engages cut-out section 67 when activated, causes the inner disk member 40 to rotate to the position illustrated in FIG. 8, thus causing the access opening 60 of the inner disk member 40 to align with the access opening 60 on the outer disk member 42, thus, forming a dispensing opening 70 as illustrated in FIG. 8. In this position, the springs 58 are in tension. Thus, when the solenoid 86 is deactivated, the springs 58 will return the disk members 40,42 to their normally closed position as illustrated in FIG. 7. It is to be understood that any other mechanism or arrangement may be used for rotating of the disk members 40,42 relative to one another. It is only necessary that they be moved relative to one another so that access opening 60 aligns to form opening 70. As illustrated in FIGS. 7 and 8, the projection 52 and mating groove 54 are designed to provide a stop to prevent any further movement. In particular, projection 52 has a inner end 91 and an outer end 93. The outer end 93 of the projection 52 of outer disk member 42 abuts against the inner end 94 of the groove 54 of the inner disk member 40. Likewise, the end 93 of projection 52 of disk 40 (not shown) abuts against the end 94 of the groove 54 of disk 42 to limit motion of the two disks in the other direction. Thus, there is provided positive means for limiting the relative motion of the two disk members 40,42 between the fully opened position illustrated in FIG. 8 and the fully closed position of FIG. 7 minimizing any potential accidental removal of cartridges.

As illustrated in FIG. 5, the inner and outer disk members 40,42 are each provided with an inner hub 18 having a ledge portion 19. The ledge portion 19 of outer disk 42 of upper shutter assembly 36 is used to retain the upper shutter assembly 36 to uppermost core member 12. Whereas the ledge portion 19 of outer disk 42 of the lower shutter assembly 38 is designed to mate with a retaining lip, a locking cap 95 used to retain the lower shutter assembly 38 to the magazine (see FIG. 5). The cap 95 is provided with an inner projecting member 101 having a lip portion 102, which is designed to engage the retaining recess 32 of the lowermost core member **12*e*, thus, retaining the lower shutter assembly 38 to the magazine. The length of projection 101 is such that the core members 12** are still allowed to easily rotate about the axis x—x with respect to each other.

Figure 1A:
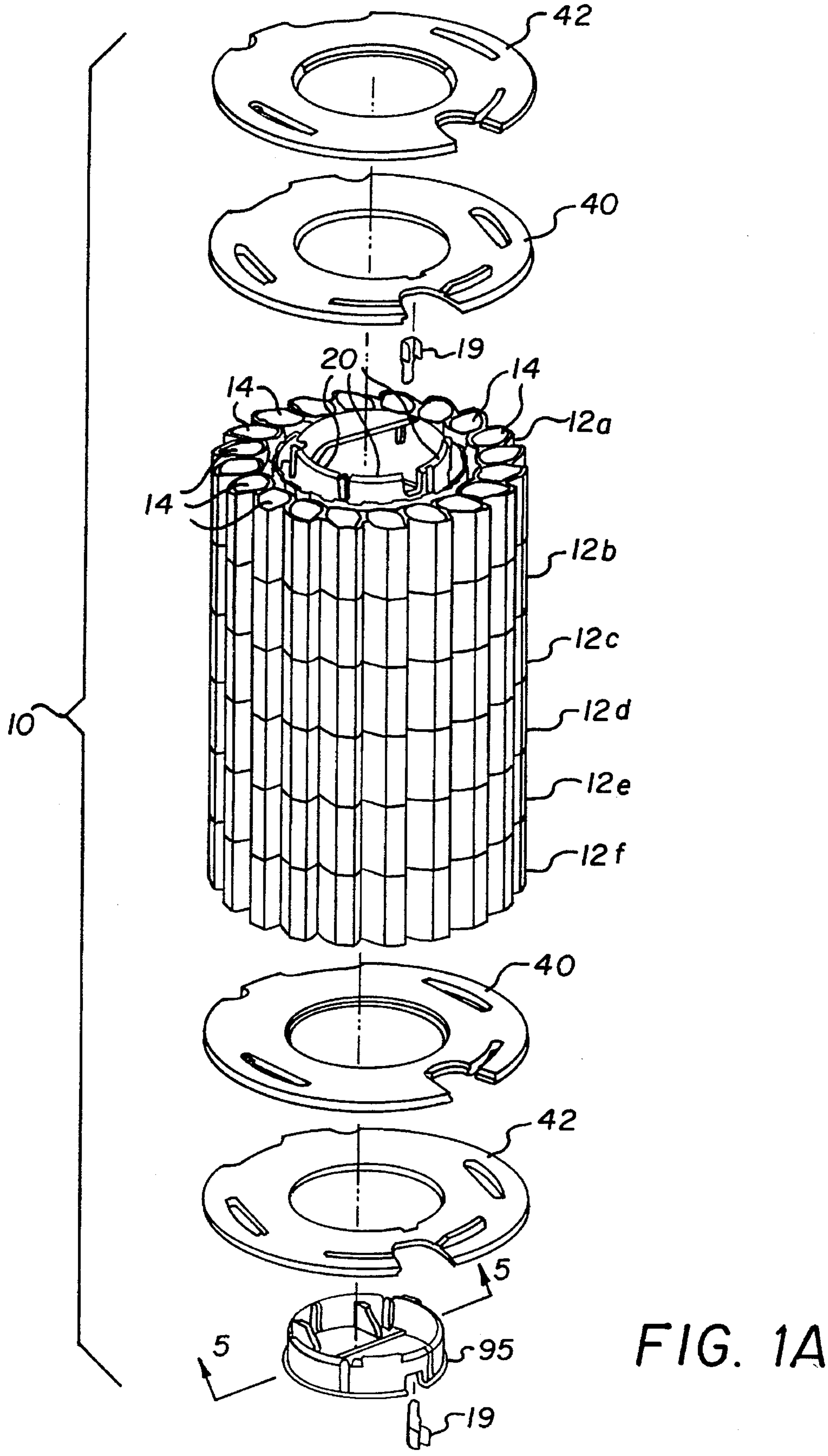
FIG. 1A is an exploded view of a magazine made in accordance with the present invention.
Figure 1B:
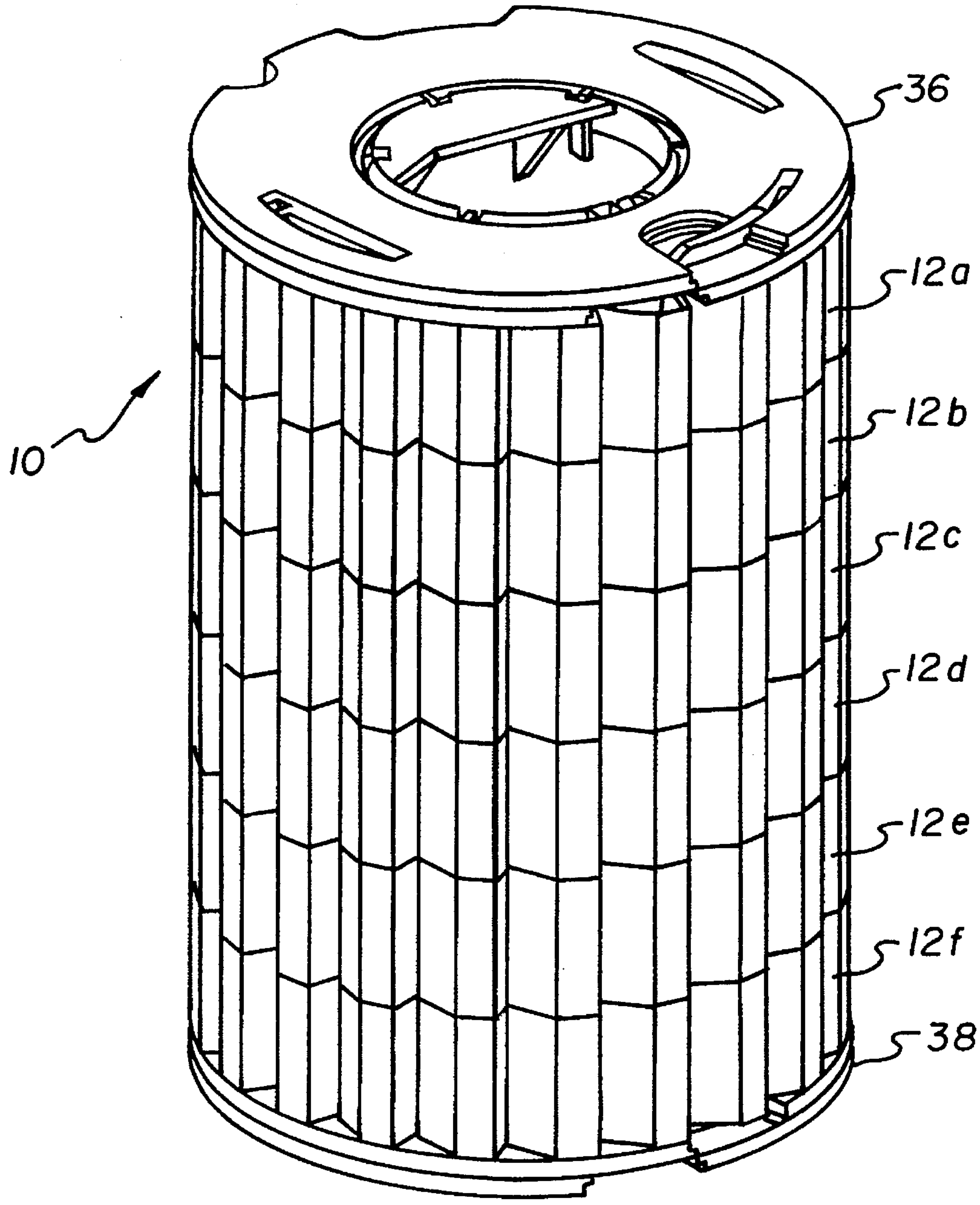
FIG. 1B is an assembled enlarged view of the magazine of FIG. 1A.

As shown in FIG. 1A, a slideable lock member 21 is provided for locking the shutter assemblies 36,38 in position with respect to core member 12 so as to prevent relative rotation therewith. When lock member 21 is disengaged, for example, when the magazine is mounted to plate 80, each of a the disks 40 are free to rotate with respect to each other.

It is to be understood that various other changes and modifications may be made without departing from the scope of the present invention. The present invention being defined by the following claims:

Parts List:

10 . . . magazine
**12*a–f*** . . . plurality of core members
14 . . . sleeves
15 . . . film cartridge
18 . . . hub
19 . . . ledge portion
20 . . . projecting members
21 . . . locking member
23 . . . annular recess
26 . . . annular projecting member
28 . . . step ridges
30 . . . step recesses
31 . . . handle
32 . . . corresponding step recesses
33 . . . cut-outs
34 . . . step projections
36,38 . . . shutter assembly
40 . . . inner disk member
42 . . . outer disk member
44 . . . circular member
46 . . . inner surfaces
48 . . . outer surface
52 . . . arcuate extending projecting member
54 . . . circumferential extending groove
55 . . . pair of openings
56 . . . hole
58 . . . spring
59,61 . . . end
60 . . . access opening
67,69 . . . cut-out sections
68 . . . top
70 . . . dispensing opening
80 . . . mounting plate
82 . . . first projection
84 . . . second projection
86 . . . solenoid
87 . . . arrow
91 . . . inner end
93 . . . outer end
94 . . . inner surface
95 . . . cap
101 . . . inner projecting member
102 . . . lip portion

We claim:

1. A magazine for containing a plurality of film cartridges, said magazine comprising at least one storage disk having a plurality of sleeves defining passages at both ends for retaining at least one of the film cartridges between said open ends, said magazine having an shutter mechanism disposed adjacent at least one of said at least one storage disk, said shutter mechanism comprising a first dispensing disk having a first access opening and a first central axis of rotation, and a second dispensing disk associated with and adjacent to the first dispensing disk, said second dispensing disk having a central axis of rotation in co-alignment with said first central axis and a second access opening, the second access opening being positioned on said second dispensing disk such that when said first and/or second dispensing disk is rotated about said central axis of rotation, said second access opening of said second dispensing disk is capable of aligning up with said first access opening of said first dispensing disk; and means for biasing said first and second dispensing disks about said first and second central axis of rotation such that the access openings of said first and second dispensing disks can be moved between an aligned position and nonaligned position.

2. A magazine according to claim 1 wherein said biasing means for biasing said first and second dispensing disks for rotation about said central axis comprises at least one spring member having one end secured to said first dispensing disk and the other end secured to the second dispensing disk such that a circumferential biasing force is provided between said first and second disk.

3. A magazine according to claim 2 wherein there is provided a pair of spring members for biasing said first and second dispensing disks apart.

4. A magazine according to claim 1 wherein said first and second disks are provided with means for allowing rotating said first and second disks between said aligned and nonaligned positions.

5. A magazine according to claim 4 wherein said means for allowing rotating of said first and/or second dispensing disks in opposite circumferential directions comprises a pair of slots associated with each of said first and second dispensing disks.

6. A magazine according to claim 1 further comprising locking means for locking said first and second disk and said adjacent storage disk together.

7. A magazine according to claim 6 wherein said locking means comprises an axial extending locking slot in each of said dispensing disks positioned such that when the access opening in said first dispensing disk is aligned with the access opening in said second disk, said axial locking slots in each of said dispensing disks are also aligned.

8. A magazine according to claim 1 further comprising means for defining said aligned and nonaligned positions.

9. A magazine according to claim 7 wherein there is provided an circumferentially extending slot in each of said first and second dispensing disks and a mating projection in with each, of said first and second dispensing disks designed to engage the aligning slot in the other dispensing disk, said projection and slot being configured so as to define the aligned and non-aligned positions.

10. A magazine according to claim 9 wherein said projection prevents cartridges from entering the access opening in said dispensing disks.

11. A magazine according to claim 1 wherein said first disk is positioned such that said first access opening is positioned adjacent said sleeves in said storage disk.

12. A method of dispensing or inserting film cartridges into a film cartridge magazine, said magazine comprising at least one storage disk having a plurality of sleeves defining passages at both ends for retaining at least one of the film cartridges between said open ends, said magazine having a shutter mechanism disposed adjacent at least one of said at least one storage disk, said shutter mechanism comprising a first dispensing disk having a first access opening and a first central axis of rotation, and a second dispensing disk associated with and adjacent to the first dispensing disk, said second dispensing disk having a central axis of rotation in co-alignment with said first central axis and a second access opening, the second access opening being positioned on said second dispensing disk such that when said first and/or second dispensing disk is rotated about said central axis of rotation, said second access opening of said second dispensing disk is capable of aligning up with said first access opening of said first dispensing disk; and means for biasing said first and second dispensing disks about said first and second central axis of rotation such that the access openings of said first and second dispensing disks can be moved between an aligned position and non-aligned position, the method comprising the step of:

rotating said first and second dispensing disks such that the accessing openings are in co-alignment so that film cartridges can be inserted or removed from said sleeves.

* * * * *